United States Patent

[11] 3,631,346

| | | |
|---|---|---|
| [72] | Inventor | Robert F. Riggs<br>Charlottesville, Va. |
| [21] | Appl. No. | 7,483 |
| [22] | Filed | Feb. 2, 1970 |
| [45] | Patented | Dec. 28, 1971 |
| [73] | Assignee | Sperry Rand Corporation |

[54] LOW SELF-NOISE RADIOMETER SYSTEM
7 Claims, 7 Drawing Figs.

[52] U.S. Cl. ................................................. 325/363,
250/83, 324/58, 325/386, 332/51 W, 333/7
[51] Int. Cl. ............................................................ G01t
G01r 27/04
[50] Field of Search........................................... 250/83 R;
324/58.5, 58, 95; 325/67, 363, 364, 386, 445;
332/51 W, 53, 54, 56; 333/7, 10, 11, 98 S

[56] References Cited
UNITED STATES PATENTS

| | | | |
|---|---|---|---|
| 3,409,827 | 11/1968 | Goggings, Jr. ................ | 324/58.5 |
| 3,486,112 | 12/1969 | Bayer ............................. | 325/363 X |
| 2,901,700 | 8/1959 | Bolie .............................. | 324/95 |
| 2,892,157 | 6/1959 | Schlansker et al. ........... | 332/54 |
| 3,356,917 | 12/1967 | Goldstein ...................... | 332/56 X |
| 1,638,993 | 8/1927 | Hartley ......................... | 332/56 |

Primary Examiner—Benedict V. Safourek
Attorney—S. C. Yeaton

ABSTRACT: An improved microwave radiometer of the comparison type features elimination of broadband amplification through the employment of a modified high-frequency switch operating on the signal to be investigated in cooperation with a broadband low self-noise detector. The switch cyclically exposes the signal to be investigated and a reference signal to the detector at a rate of switching such that a strong component of the detected signal falls within the passband of a narrow band comparison and indicator system.

INVENTOR
ROBERT F. RIGGS
BY
ATTORNEY

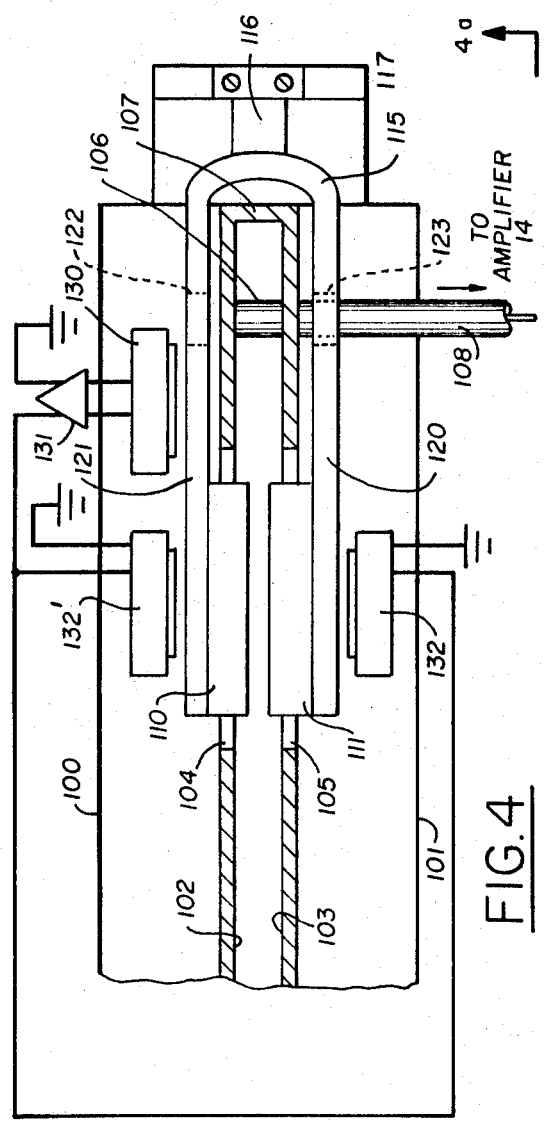
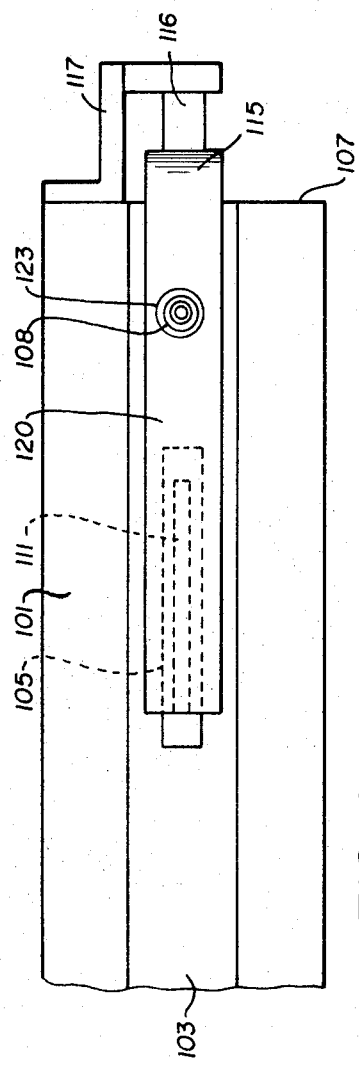

3,631,346

LOW SELF-NOISE RADIOMETER SYSTEM

BACKGROUND OF THE INVENTION

1. Field of the Invention

The invention pertains to the art of microwave radiometry using comparison of the amplitude of a signal to be investigated, such as a thermal noise signal, to the amplitude of a locally generated reference signal. In this type of radiometer, an amplitude detector is connected alternately through a receiver system first to an antenna and then to a local reference signal generator.

2. Description of the Prior Art.

While other types of radiometric devices have been used with some success, the comparison type of radiometer has been the most widely used type for the examination of relatively low level noiselike radiofrequency signals, especially where the noise signals to be examined are often small in comparison to the internally generated noise level within the radiometer receiver. Comparison radiometer systems effect substantial cancellation of the receiver background noise and self-noise, permitting relatively accurate measurements of low-level radiofrequency input signals.

While there are other types of comparison radiometers, one popular type of radiometer, particularly for use in the microwave region, is the classic Dicke radiometer. The method employed therein consists essentially of the comparison of an unknown noise signal amplitude coming from a source to be examined with a noise signal from a known source, and the method can be used for measuring the effective temperature of an unknown source with considerable accuracy. In this instrument, the receiver input is switched between the antenna and a local reference signal generator at a relatively high rate, and the detected and amplified receiver output is coupled to a phase detector operating in synchronism with the switching rate. The final unidirectional output signal from such a radiometer is proportional to the difference between the temperature of the reference signal source and of the temperature of the source viewed by the antenna, since the phase detector acts automatically to subtract the background or internal noise of the receiver.

While the radiometers of the Kicke type and generally of the comparison type have certain advantages, they may also have certain clear disadvantages. Serious disadvantages include relatively high cost and weight, complexity, and power demand. While expensive and bulky wideband amplifier tubes of the travelling wave type are available, they do have bandwidth limitations and are not simple, long-life devices that are readily incorporated in compact, lightweight, low-power-consuming receivers ideal for many radiometric purposes. Neither are receivers employing such velocity modulation tubes capable of higher levels of sensitivity.

For example, sensitivity of a radiometer receiver is normally limited by the noise figure of the broadband amplifier, by its bandwidth, and by the time constant of the lowpass-filter-output-meter combination of the receiver. The broadband amplifier is usually either a travelling wave tube or an intermediate frequency amplifier. Use of an intermediate frequency amplifier requires that a complex and costly mixer and microwave local oscillator be placed ahead of it in the receiver in order to superheterodyne the signal. The superheterodyne systems usually have a good self-noise figure, but are generally relatively narrow band. Systems employing radiofrequency amplifiers such as travelling wave tubes have a somewhat greater passband than the superheterodyne systems, but are relatively costly, heavy and expensive.

SUMMARY OF THE INVENTION

The present invention is an improved radiometer providing means for detecting and measuring very weak electromagnetic signals, including noise signals of the thermal noise level type and comprising relatively simple apparatus that will accept a much wider band of signals than do prior art radiometric devices and which will thereby detect weaker signals. Having greater sensitivity than ordinary radiometers, the invention uses simple components of relatively low cost and weight and is also relatively more reliable than prior art radiometers.

In the invention, signals to be investigated are received by a suitable antenna and are compared with signals provided by a reference signal generator. Normally, the signals being compared are broadband or white noise. A microwave switching device operated at a relatively high rate cyclically applies the received and reference signals to a special diode detector operated in the $1/f$ or hyperbolic region of the detector self-noise versus frequency characteristic.

The output of the detector is an audio signal having a strong component of the same frequency as the frequency at which the microwave switch is switched. The audio is applied in the usual manner through a narrow band amplifier to a phase sensitive detector, thence through a low-pass filter and DC amplifier to a zero center DC meter.

BRIEF DESCRIPTION OF THE DRAWINGS

FIG. 4 is a view partly in cross section of an alternative form of the switch;

FIG. 4a is a view from below the switch of FIG. 4; and

DESCRIPTION OF THE PREFERRED EMBODIMENT

Figure 1:
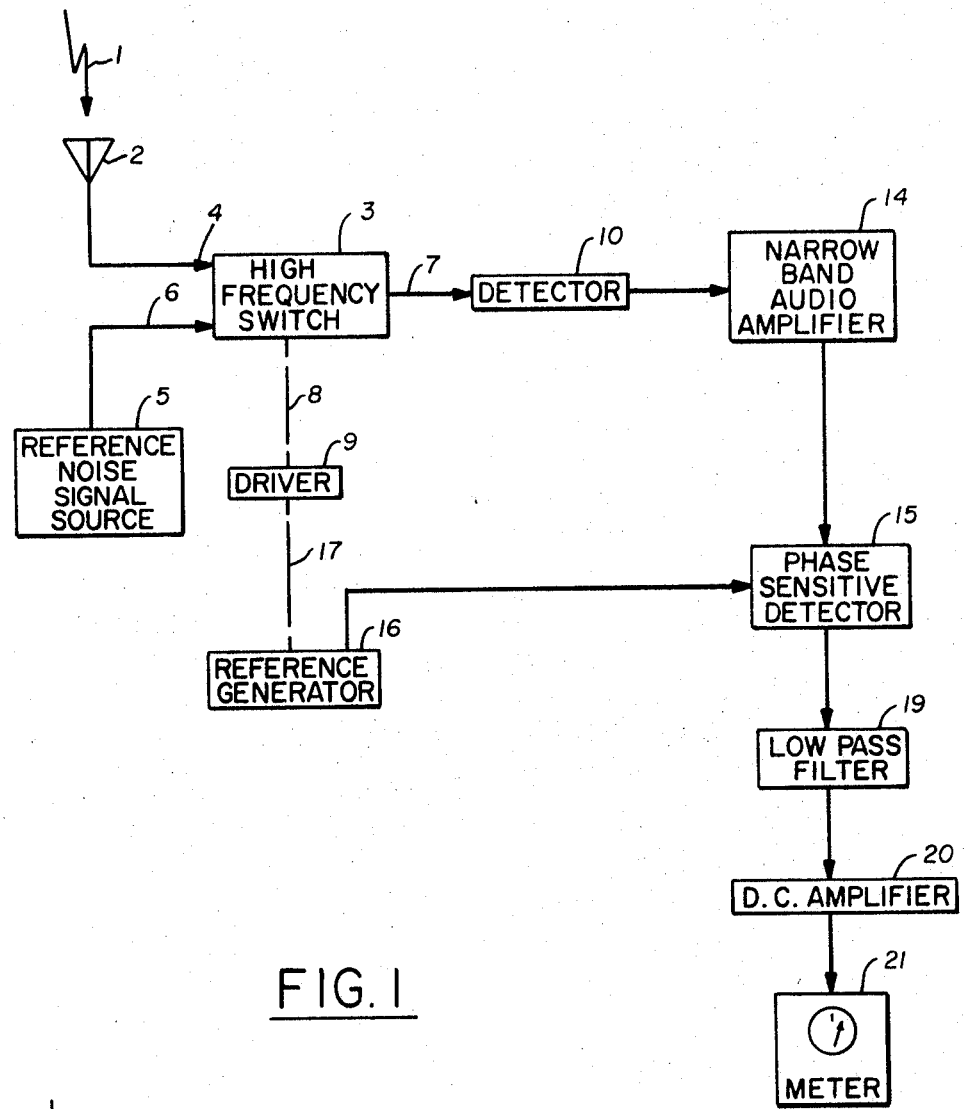
FIG. 1 is the circuit of the radiometer system.

In FIG. 1, there is illustrated a block diagram of the novel radiometer system. While shown in block diagram form, it will be seen that the invention is useful over a wide spectrum of radiofrequencies, and that it is of particular merit for use in the high-frequency or microwave bands, including those of the ultrahigh-frequency region and higher. It will be understood that the invention is useful in comparison radiometers of the type in which the radiometer receiver is cyclically switched from a receiving antenna to a reference noise signal source and is particularly useful in the aforementioned Dicke type of comparison microwave receiver in which a noise reference element or source of known temperature is physically cyclically injected into the transmission line joining the receiving antenna to the radiometer receiver.

In FIG. 1, signals 1 such as, for instance, low power noiselike radiofrequency signals commonly associated with cosmic or space thermal radiation, generated from any source to be examined by the radiometer, are received by an antenna 2 which may be any of various types of broadband microwave or other antennas well known in the radiometer art. The antenna accepts those signals falling within its passband and supplies then to an input 4 of a high-frequency signal switching device 3. An opposite pole or input 6 of switch device 3 is supplied with the output of reference noise signal source 5.

Switch 3 may be a conventional low-noise microwave switch and it functions cyclically and alternately to connect antenna 2 or reference noise source 5 to the input 7 of the remaining elements of the radiometer receiver. In FIG. 1, switch 3 is shown as actuated by a mechanical link 8 operated by driver 9, which may be a suitable electric motor. Alternatively, a form of the invention may employ a conventional ferrimagnetic or other microwave switch, whose state is cyclically changed by driver circuit 9. In a preferred form of the invention, a novel modified microwave switching device is employed, for reasons later to be discussed.

Figure 2:
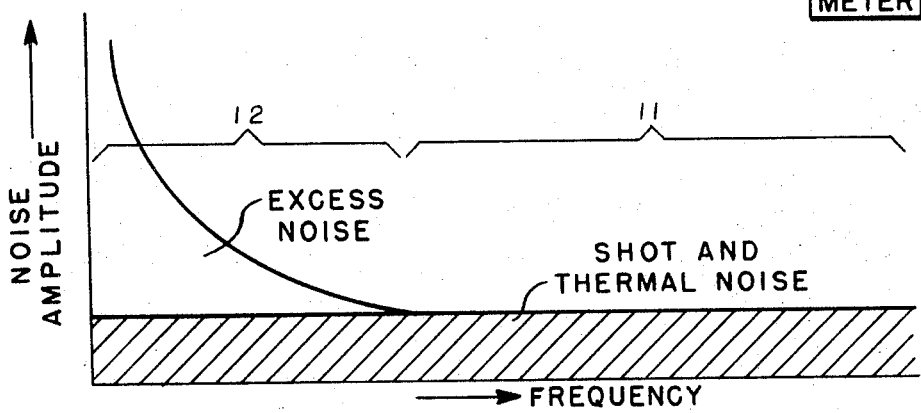
FIG. 2 is a graph useful in explaining its operation.

The input transmission line 7 supplies the cyclically varying signal propagating within it to diode detector 10. Signal detector 10 has an unusual mode of operation in the present invention. Whereas it is the usual practice to operate such microwave diode detectors in a flat intermediate region where the self-noise generated by the diode is substantially shot and thermal noise and is substantially constant and low, the diode detector 10 is operated instead in a relatively unused region where excess noise may be significant. Self-noise is any conventional electrical noise signal generated within a circuit or circuit element. It may be comprised primarily of thermal noise of the type conventionally referred to and referred to herein as that caused by random motions of charged particles or electrons within a resistor or semiconductor or other element. Thermal noise and its relation to the actual temperature of the circuit element are discussed by many authors, including Aldert van der Ziel in *Noise*, Prentice-Hall, Inc., 1954 (see chapter 2). Similarly, shot noise in semiconductors as used herein and as conventionally used is considered to be caused by the drift of electrons as discrete charged particles when a bias voltage is applied to the circuit element. Shot noise has a relatively low value compared to thermal noise in the diodes considered herein. The term shot noise is discussed in chapter 8 of the van der Ziel book and elsewhere as is the term excess noise, a term also well established in the art, especially as applying to semiconductor and vacuum tube devices. Thermal and shot noise are essentially broadband or white noise signals having a substantially constant level at all frequencies, as indicated in FIG. 2. Excess noise, however, varies in amplitude as discussed by van der Ziel over a wideband as an inverse or hyperbolic function of frequency. Excess noise as used herein is conventionally also called $1/f$ noise, as its spectrum varies hyperbolically with frequency. For example, in conventional practice, such detectors are often operated in the flat frequency band indicated by reference numeral 11 in FIG. 2. On the other hand, in practicing the present invention, it is preferred to operate in the so called $1/f$ or hyperbolic part of the curve of FIG. 2, as indicated by reference numeral 12, which part lies in many diodes available on the market in the region from a few cycles per second to 1 MHz. It will be understood that the experience is that diodes of the desired type do not generally have characteristics such that they fall exactly on the $1/f$ curve, but only substantially so. Such diodes include the Schottky barrier diode and the tunnel diode.

Suitable diodes for use in such detectors are readily available and demonstrate quite low noise characteristics even in the hyperbolic region 12. The operating location in region 12 is deliberately selected at as low a noise level as possible. However, the operating point is also dictated by the upper limit of the switching rate of switch 3 at which a proper degree of switching is still attained, as will be further discussed. A further desirable feature attainable in properly designed diode and diode mounting structures for such detectors is a very wideband width; passbands on the order of 40 GHz have been reported in the literature for diode detectors suitable for the present application. Passbands on this order ensure that the inventive radiometer is capable of broadband operation hitherto unattainable in the radiometer art.

The output of detector 10 has a significant component that falls at an audiofrequency equal to the frequency of operation of switching device 3; it is supplied to a conventional narrow band audiofrequency amplifier 14 whose narrow passband is peaked at the frequency of operation of switching device 3.

The output of audio amplifier 14 comprises one input to phase sensitive detector 15, a device employed in a conventional manner to detect the relative amplitudes of two input signals, one of which may be a reference signal, and also to indicate which input signal it is that is greater. To permit such a result, phase detector 15 is supplied in addition with a reference signal from a phase reference generator 16, preferably in the form of a sinusoidal voltage, though other waveforms may be used. Reference generator 16 is driven in synchronism with switch 3, for instance, by causing the driver 9 to operate switch 3 through a mechanical linkage 17. As will be seen, reference generator 16 is preferably phased with respect to switch in a particular manner.

As is conventional practice, the output of phase sensitive detector 15 is a polarity reversing direct voltage, which signal is subjected to the action of a low-pass filter 19, is amplified by DC amplifier 20, and is displayed by a zero-center direct current meter 21. The adjustment of the phase of reference generator 16 relative to that of switch 3 is such that, when the signal 1 is equal in amplitude to the reference noise signal from source 5, the meter needle points to zero, for instance, on the scale of meter 21.

Observing FIG. 2, it is seen that a high rate of switching is desired for switch 3, this in order to move as far down on the curve for excess noise in the operating region 12 as possible to low self-noise values. Considerations of compactness for the apparatus also are significant and, as a consequence, one preferred form of the switching system is an electromechanically driven self-resonant system employing the waveguide switch of FIG. 3, for example.

Figure 3:
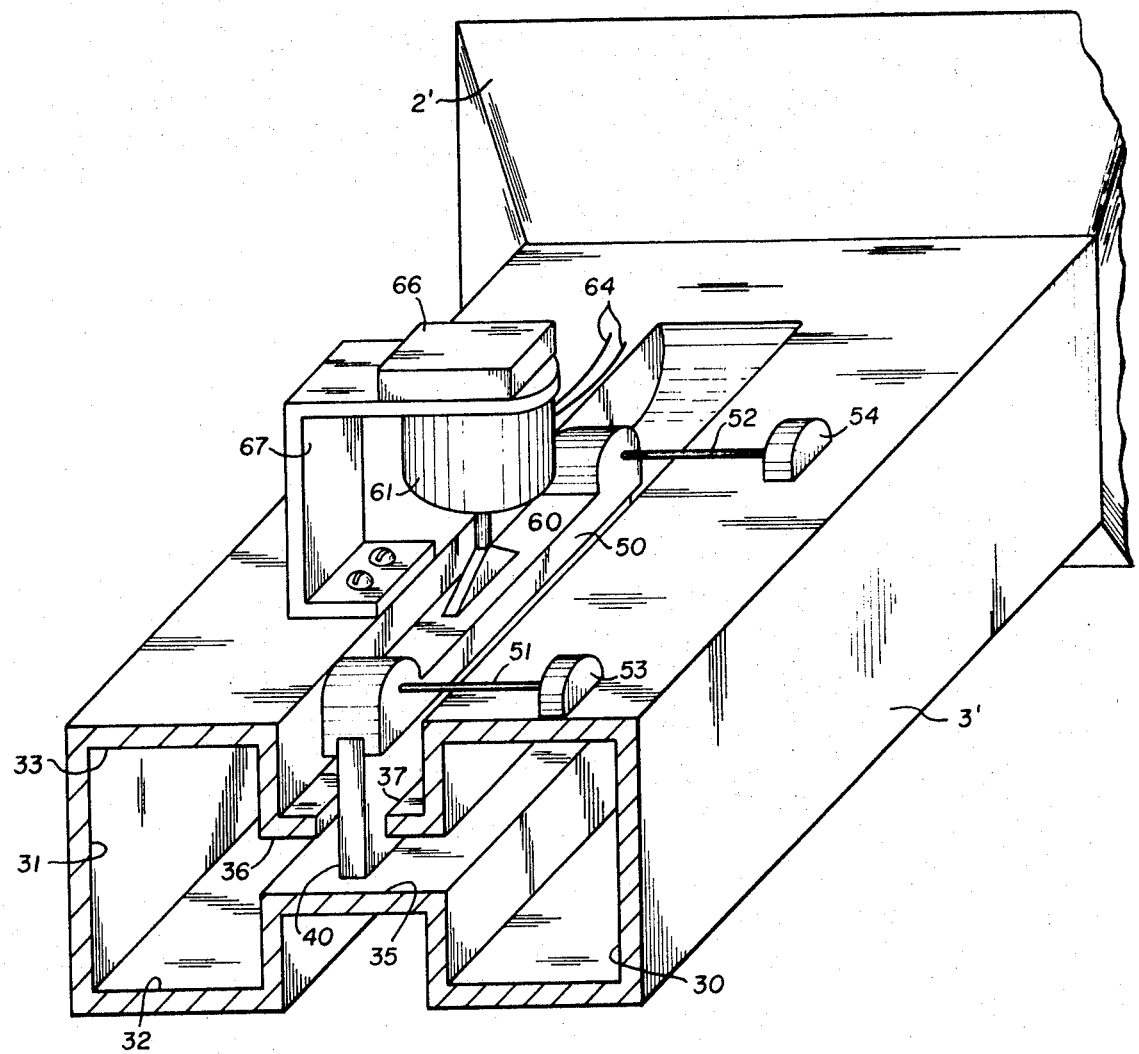
FIG. 3 is a perspective view partly in cross section of the waveguide switching device used in the system.

Other aspects of the novel radiometer concept of FIG. 1 will be appreciated from the following additional discussion of its operation. Signals 1 to be observed are fed by the antenna 2 of FIG. 1 through a cyclically operated switch 3, like switch 3' of FIG. 3 further to be discussed, into radiometer receiver elements which follow switch 3. In alternate half cycles, a reference noise signal from reference noise signal source 5 is injected into the receiver by switch 3. More particularly, the received radiation is fed to the next stages of the radiometer receiver through a ridged waveguide section 3', as shown in FIG. 3, in and out of which a microwave energy absorbing slab 40 is caused to be cyclically moved by driver 61 and its associated controls. The absorbing slab 40 can be said to produce a nearly sinusoidal modulating effect, being alternately projected into the waveguide 3', through slot 37 and alternately withdrawn from guide 3'. Thus, part of the time, the ridged waveguide 3' appears to the radiometer receiver system to be terminated by antenna horn 2', while part of the time it appears to be terminated by the absorbing slab 40. The latter is generally at room temperature or at some known predetermined temperature.

If the signal received by antenna 2' happens to represent a source having the same effective temperature as that of slab 40, oscillation of the slab has no modulation effect on the noise signal admitted from horn 2' to the radiometer receiver. On the other hand, if the two effective noise temperatures are not the same, the noise power fed into the receiver via detector 10 is substantially a sine wave modulated at the frequency of oscillation of slab 40. The phase of the sine wave depends upon which noise signal of the two being compared is greatest.

The signal to be examined passes next to the last of the microwave circuit components of the radiometer system, namely, the crystal detector 10. Modern crystal detector units are capable of extremely wideband operation, on the order of the band passed by horn antenna 2' and switch 3'. Also, modern detector crystals have significantly improved self- or internal-noise characteristics. Thus, in contradistinction to the prior art practice, no elements need be included in the microwave channel which have the effect of reducing sensitivity of the receiver or of its operating bandwidth, and thus throwing away useful signal power appearing at the output of switch 3'.

A feature of the invention which aids in affording the above desired result lies in the use of microwave switch 3' operated at a high switching frequency in combination with very wideband circuits and especially with a detector 10 operating primarily at a corresponding switching frequency level along the portion 12 of the characteristic curve of FIG. 2. Note that region 12 may extend from a few cycles per second (past the point at which the curve heads for infinity at a substantial rate) substantially to the point at which region 11 of the curve begins. By this means, a very great portion of the power of the signal useful in the portion of the system following detector 10 is advantageously retained, rather than being made unavailable through the use of relatively narrow band RF or IF amplifier circuits and the relatively low-frequency switching of the prior art.

Be it understood that the noise signals involved have a broad and continuous frequency spectrum. When these frequency components are modulated by the oscillation of slab 40, sideband frequencies are generated, displaced relative to each component noise frequency by the switching frequency. However, a strong component of the modulation product is a signal of frequency equal to that of the switching rate. In effect, the consequence of the foregoing is that a major part of the noise signal energy is translated so that it becomes crowded within the narrow band centered on the switching frequency, a consequence that is advantageously employed in the remaining, nonmicrowave portion of the radiometer system. It is thus the preferred manner of operation of the invention that the modulation frequency be made as high as is possible within the conceivable limits of switching operation of the switch 3, and also that the switching frequency fall within region 12 where the excess noise contribution of diode detector 10 is represented by the only slightly tilted portion of the curve, since instability would be characteristic of operation on the steep part of the curve as very high noise levels are approached.

The enhanced signal output produced by switch 3 and diode detector 10, as previously explained, is now applied to narrow band audio amplifier 14. The center of the passband of amplifier 14 is adjusted to be the same as the switching frequency of switch 3. Its passband is narrow, but adjusted to encompass a major portion of the spectral energy which the noise switch-detector system including elements 3 and 10 has compressed about that center frequency. In a manner apparent from the previous discussion, the reference generator 16 and amplifier 14 output signals are phase detected (15), submitted to a low-pass filter 19, amplified (20) if necessary, and are applied to meter 21.

In FIG. 3, the waveguide switching device 3 of FIG. 1 employs a ridged waveguide having the usual sidewalls 30 and 31 and upper and lower walls 32 and 33. Wall 32 is provided with a continuous ridged portion 35, while the upper wall 33 has a similar ridged portion 36 except that ridge 36 has a longitudinal slot. Slot 37 is cut with slightly greater width and length than the width and length of slab 40 made of resistive material which readily absorbs energy capable of propagating within the waveguide and which will, therefore, also serve as an emitter of such radiation, thus serving the function of the reference noise signal source 5 of FIG. 1. Ridged waveguide is employed so that the microwave electric field tends to be concentrated in the immediate vicinity of slab 40. Slab 40 may be formed of a sheet of glass coated on both sides with a thin film of nickel or of a nickel-chrome-iron alloy or may consist of a polyiron material imbedded in a plastic material. Slab 40 is arranged cyclically to move between two extreme positions. One position, illustrated in FIG. 3, inserts a slab 40 substantially fully into the region between ridge walls 35 and 36. In the second extreme position, slab 40 is raised so that it is substantially fully removed from the space between walls 35 and 36. In this second position, the bottom edge of slab 40 may, for example, be moved upward where it lies in the same plane as the inner surface of wall 36.

To facilitate the resonant oscillation of slab 40 in and out of the waveguide interior, it is affixed to an upper carrier element 50, which carrier element is, in turn, supported by a pair of wire springs 51 and 52 of appropriate stiffness from bosses 53 and 54 stemming from the upper surface of waveguide wall 33. Slab 40 and carrier 50 are further supported by rod 60 which is coupled to the armature (not shown) of a driver coil 61 of the conventional type. Coil 61 is driven via conductors 64 by a suitable source of alternating current tuned to the resonant frequency of the electromechanically resonant system above described. In fact, the driving coil may be supplied with a pickoff coil (not shown) whose output may, in the well-known manner, be supplied to a driver amplifier with an output coupled to conductors 64.

In any event, a reference generator 16 (FIG. 1) must be supplied for generating the aforementioned reference signal for application in phase sensitive detector 15. FIG. 3 represents one form of a reference generator by the box 66 placed on top of the support which holds driver coil 61 above the waveguide system.

Figure 3A:
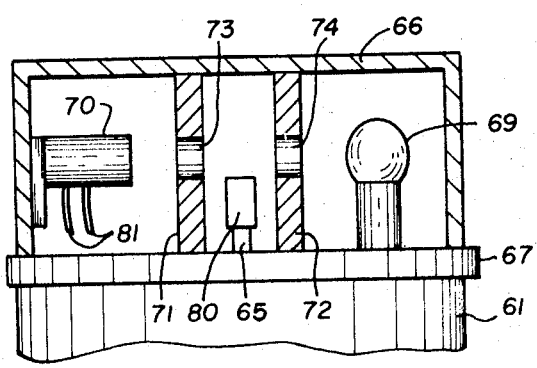
FIG. 3a is a fragmentary view of a portion of the switch of FIG. 3, partly in cross section.

FIG. 3a shows the details of the pickoff within box 66; it is mounted atop of support 67 above coil 61 and comprises a photodiode pickoff system including a light source 69 and photodiode 70. Separating the latter two elements is a pair of spaced masks 71 and 72 with substantially equal apertures 73 and 74 in their respective upper portions. An opaque shutter 80 is provided of dimensions somewhat greater than the dimensions of, for instance, aperture 73. Shutter 80 is mounted on the upper end of rod 60 which moves slab 40 and which extends through driver coil 61 so as to move shutter 80 in synchronism with slab 40. When slab 40 is inserted fully within waveguide switch 3, apertures 73 and 74 are open and diode 70 is fully illuminated. Conversely, when slab 40 is at its uppermost position, no light from lamp 69 reaches diode 70. A sinusoidal reference voltage may thus be generated on conductors 81 for application as a reference signal to phase sensitive detector 15 of FIG. 1. It should be borne in mind that various reference pickoff devices, yielding reference voltages of various fixed phases with reference to the desired phase may be tolerated. Since the reference generator output has substantially a fixed frequency, such phase variations can be readily corrected in the well-known manner through the use of simple fixed phase shifter networks.

Figure 5:
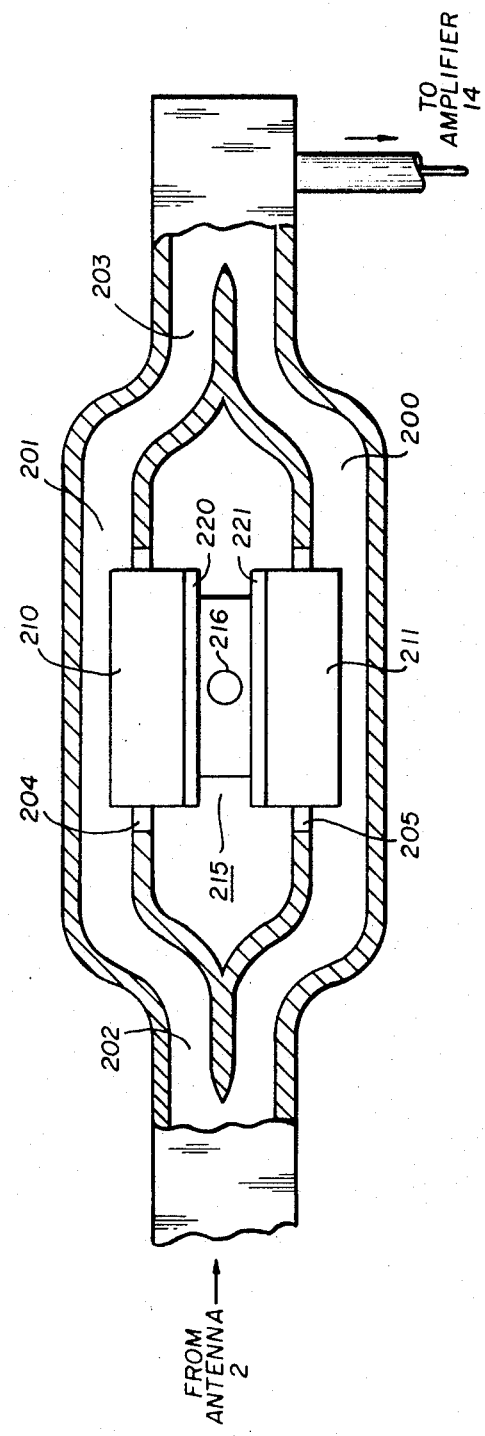
FIG. 5 is a view in cross section of a further alternative to the switch of FIG. 3.

The apparatus of FIG. 3 is well suited to high rate switching of high-frequency signals. For very high-frequency bands, ridged waveguide becomes very small in size; for example, the gap between the ridges of a transmission line operating within the K band of frequencies is about 0.025 inches, while the width of the ridge is usually about 0.076 inches. Other dimensions of the cross section of the guide are proportionally small. While the arrangement of FIG. 3 is useful within that band region, FIGS. 4, 4a and 5 illustrate alternative embodiments of the switch having particular advantages for use in the K band spectrum or at higher microwave frequencies.

Referring now to FIGS. 4 and 4a, the novel switch employs ridged waveguide, as was used in FIG. 3, comprising an upper wall 100 and a lower wall 101 having respective ridged wall portions 102 and 103 with inner surfaces forming a narrow gap within which the electric field tends to concentrate in the well-known manner. In this embodiment, both ridged wall portions are provided with slots like slot 37 in wall 36 of FIG. 3. For example, wall 102 is provided with a longitudinal slot 104 facing a similarly placed slot 105 in the opposite ridge wall 103. Microwave energy from antenna 2 propagates through the slotted region of the guide to be detected by detector 106 located in the gap between ridges 102, 103 adjacent waveguide short or end wall 107. Detected energy is transmitted to narrow band audio amplifier 14 via shielded transmission line 108.

Each gap 104 and 105 is provided with a respective energy absorbing slab 110 and 111 mounted for cooperative motion into and out of the gap between ridged walls 102 and 103. Slabs 110, 111 are cyclically moved so that they substantially touch within the guide and are then synchronously moved so that they are substantially removed from the guide. A cyclic, substantially sinusoidal modulation of propagating energy results, as before.

Slabs 110, 111 are mounted upon and are moved in push-pull fashion by a vibratable fork structure 115 whose nonvibrating stub 116 is held in mounting bracket 117 affixed to end wall or short 107. Arms 120, 121 are provided with means adjacent their respective free ends for mounting absorber slabs 110, 111. Arm 120 is provided with a hole 123 through which passes the shielded cable 108 leading from detector 106 (numbered 10 in FIG. 1) to narrow band amplifier 14. Upper arm 121 has a similar hole 122 merely for the purpose of balancing the fork 115.

Operation of the device of FIGS. 4 and 4a is apparent from the foregoing discussions of the FIGS. 3, 4 and 4a structures. It is apparent that the slabs 110, 111 now are required, for the same size of waveguide gap, to move only half the distance that slab 40 of FIG. 3 must move and that high-frequency switching action is readily attained.

It is apparent that the vibratable fork 115 may be driven as in FIG. 3 or may be driven in the manner commonly used to drive conventional tuning forks. For example, an inductive pickoff coil 130 affixed to the waveguide adjacent arm 121 of fork 115 may be used to pick off an alternating signal whose frequency is determined by the resonant frequency of fork 115. That signal may be amplified (131) and applied to push-pull inductive driver coils 132, 132', respectively affixed to the waveguide adjacent the arms 120, 121 of fork 115.

In the alternative structure of FIG. 5, the microwave propagation system comprises parallel wave guiding channels 200, 201 fed from antenna 2 through a conventional impedance matched signal divider section 202. The outputs of channels 200, 201 are, in turn, combined by a similar combiner section 203. Ridged waveguide may be employed.

A vibratable fork 215, driven in a manner such as previously described, has arms 220 and 221 projecting into the volume between channels 200 and 201. Fork 215 is supported from stub 216 from the waveguide system in any convenient manner. Mounted on arm 220 is an absorber slab 210 projecting through slot 204 in the lower wall of channel 201. Similarly, there is mounted on arm 221 an absorber slab 211 projecting through slot 205 in the upper wall of channel 200. It is apparent that the longitudinal axis of fork 215 is at right angles to the propagation structure in FIG. 5, while in FIG. 4 these elements were in parallel alignment. Also, operation of the embodiment of FIG. 5 is apparent upon calling to mind the manner of operation of FIGS. 4 and 4a. It may be observed that the vibratable fork systems of FIGS. 4 and 5 have particular utility for high rate switching of very high-frequency signals propagating in ridged waveguide, and are particularly effective in achieving good depth of modulation for the signals being processed.

While the invention has been described in its preferred embodiment, it is understood that the words which have been used are words of description rather than of limitation and that changes within the purview of the appended claims may be made without departure from the true scope and spirit of the invention in its broader aspects.

I claim:
1. Radiometer apparatus including:
antenna means,
reference electrical noise source means,
switch means having output port means and adapted alternately to connect said antenna means and said reference noise source means to said output port means,
driver circuit means for operating said switch means at a predetermined frequency,
semiconductor diode detector means having predetermined excess noise, shot noise, and thermal noise amplitude characteristics as a function of frequency,
said thermal and shot noise amplitude characteristics being substantially constant as a function of frequency,
said excess noise characteristic having a substantially hyperbolic characteristic as a function of frequency,
said predetermined switching frequency being equal to or less than the frequency at which said excess noise is substantially equal to the sum of said thermal and shot noise,
said semiconductor diode detector means being coupled to said switch output port means,
amplifier means responsive to said semiconductor diode detector means,
said amplifier means having a narrow passband including said predetermined switching frequency,
phase sensitive detector means responsive to said amplifier means and to said driver circuit means, and
utilization means responsive to said phase-sensitive detector means.

2. Apparatus as described in claim 1 wherein said predetermined switching frequency lies between that frequency at which said excess noise amplitude is substantially equal to the sum of said thermal and shot noise and that lower frequency at which said excess noise amplitude is substantially three times the sum of said thermal and shot noise.

3. Apparatus as described in claim 1 wherein said utilization means responsive to said phase sensitive detector means comprises:
low-pass filter means, and
display means responsive to said low-pass filter means.

4. Apparatus as described in claim 3 where said reference noise source means comprises at least one body of material having a predetermined electrical noise emitting characteristic at a predetermined temperature.

5. Apparatus as described in claim 4 wherein said switch means comprises:
hollow wave transmission line means,
said hollow wave transmission line means having at least one reentrant surface having a longitudinal slot therein, and
resonant motive means for translating said reference noise source means through said slot means into and out of said hollow transmission line means for alternately and cyclically connecting said antenna means and said reference source means to said switch output port means at said predetermined frequency.

6. Apparatus as described in claim 3 wherein:
said reference noise source means comprises a pair of bodies of material having a predetermined electrical noise emitting characteristic at a predetermined temperature, and
said switch means comprises:
hollow wave transmission line means,
said hollow wave transmission line means having opposed reentrant surfaces with opposed longitudinal slot means,
resonant fork motive means for translating said reference noise bodies through said respective slot means into and out of said hollow wave transmission line means alternately and cyclically connecting said antenna means and said reference noise bodies to said switch output port means at said predetermined rate.

7. Apparatus as described in claim 6 wherein said resonant fork motive means is adapted cyclically to translate said bodies into and out of said ridged wave transmission line in phase synchronization so that, at one instant of time both bodies are substantially removed from said ridged transmission line interior and, at a succeeding instant of time, both bodies are moved into said ridged wave transmission line interior so that they are substantially in contacting relation.

* * * * *